(12) United States Patent
Stavridis et al.

(10) Patent No.: US 11,929,780 B2
(45) Date of Patent: *Mar. 12, 2024

(54) METHODS, APPARATUS AND MACHINE-READABLE MEDIUMS RELATED TO WIRELESS COMMUNICATION IN COMMUNICATION NETWORKS

(71) Applicant: Telefonaktiebolaget LM Ericsson (publ), Stockholm (SE)

(72) Inventors: Athanasios Stavridis, Malmö (SE); Miguel Lopez, Solna (SE); Leif Wilhelmsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 84 days.

This patent is subject to a terminal disclaimer.

(21) Appl. No.: 17/619,776

(22) PCT Filed: Jun. 24, 2019

(86) PCT No.: PCT/EP2019/066721
§ 371 (c)(1),
(2) Date: Dec. 16, 2021

(87) PCT Pub. No.: WO2020/259798
PCT Pub. Date: Dec. 30, 2020

(65) Prior Publication Data
US 2022/0321215 A1 Oct. 6, 2022

(51) Int. Cl.
*H04B 10/11* (2013.01)
(52) U.S. Cl.
CPC .................... *H04B 10/11* (2013.01)
(58) Field of Classification Search
CPC ........................................... H04B 10/11
See application file for complete search history.

(56) References Cited

U.S. PATENT DOCUMENTS

| 10,165,483 B1 | 12/2018 | Liu et al. |
| 10,778,330 B1 | 9/2020 | Zoller |

(Continued)

FOREIGN PATENT DOCUMENTS

| CN | 103237292 A | 8/2013 |
| CN | 104202088 A | 12/2014 |

(Continued)

OTHER PUBLICATIONS

Silva et al., "IR-UWB-Based Non-Line-of-Sight Identification in Harsh Environments: Principles and Challenges", IEEE Transactions of Industrial Informatics, vol. 12, No. 3, Jun. 2016 (Year: 2016).*

(Continued)

*Primary Examiner* — Shi K Li
(74) *Attorney, Agent, or Firm* — Murphy, Bilak & Homiller, PLLC (57) ABSTRACT

Methods, apparatus and non-transitory machine-readable mediums are provided for wireless communication in communication networks comprising a wireless device, a radio access network node and a wireless light communication network node. In one embodiment, a method is performed by a node (102, 104, 120) of a wireless communication network (100), the wireless communication network comprising a wireless device (104), a radio access network node (102) and one or more wireless light communication (LC) network nodes (106). At least one of the wireless device and the radio access network node comprise a plurality of antenna elements configurable to provide a transmit or receive beam (110, 112) for communication with the other of the wireless device and the radio access network node. The method comprises obtaining (200) an indication of a wireless LC network node with which the wireless device has established a wireless LC connection; obtaining (202) one or (Continued)

more signal metrics for one or more transmit or receive beams which are directed towards a coverage area of the indicated wireless LC network node, or which are directed to receive transmissions from the coverage area of the indicated wireless LC network node; and determining whether or not a transmit or receive beam of the one or more transmit or receive beams corresponds to a line-of-sight (LoS) between the radio access network node and the wireless device based on a comparison (204) between the signal metric for the transmit or receive beam and a first threshold.

23 Claims, 3 Drawing Sheets

(56) References Cited

U.S. PATENT DOCUMENTS

| | | | |
|---|---|---|---|
| 11,700,560 | B2 | 7/2023 | Shiina et al. |
| 2003/0231584 | A1 | 12/2003 | Zeitfuss |
| 2005/0238172 | A1 | 10/2005 | Tamura |
| 2008/0032709 | A1* | 2/2008 | Guvenc .............. G01S 5/14 455/456.2 |
| 2014/0153923 | A1 | 6/2014 | Casaccia et al. |
| 2014/0218236 | A1 | 8/2014 | Sadeghi et al. |
| 2014/0226977 | A1 | 8/2014 | Jovicic et al. |
| 2015/0208459 | A1 | 2/2015 | Kitagawa et al. |
| 2015/0230263 | A1 | 8/2015 | Roy et al. |
| 2015/0318922 | A1 | 11/2015 | Poola et al. |
| 2016/0149302 | A1* | 5/2016 | Sanderovich ............ H01Q 3/24 343/703 |
| 2016/0198474 | A1 | 7/2016 | Raghavan et al. |
| 2016/0323801 | A1 | 11/2016 | Serita et al. |
| 2017/0047994 | A1 | 2/2017 | Logvinov |
| 2017/0132852 | A1 | 5/2017 | Morita et al. |
| 2017/0202029 | A1 | 7/2017 | Qi et al. |
| 2017/0223810 | A1 | 8/2017 | Bernsen et al. |
| 2017/0302355 | A1 | 10/2017 | Islam et al. |
| 2018/0132116 | A1 | 5/2018 | Shekhar et al. |
| 2018/0219587 | A1 | 8/2018 | Huo et al. |
| 2018/0254826 | A1 | 9/2018 | Jungnickel et al. |
| 2018/0279202 | A1 | 9/2018 | Tenny et al. |
| 2019/0110234 | A1 | 4/2019 | Peisa et al. |
| 2019/0229789 | A1 | 7/2019 | Zhang et al. |
| 2019/0319686 | A1 | 10/2019 | Chen et al. |
| 2020/0403687 | A1 | 12/2020 | Raghavan et al. |
| 2021/0067247 | A1* | 3/2021 | Liverman .......... H04B 10/1149 |
| 2023/0083292 | A1 | 3/2023 | Berner et al. |

FOREIGN PATENT DOCUMENTS

| | | |
|---|---|---|
| CN | 103259592 B | 5/2016 |
| CN | 106656326 B | 3/2019 |
| CO | 15111422 | 5/2015 |
| EP | 2926478 A1 | 10/2015 |
| EP | 3236594 A2 | 10/2017 |
| GB | 632375 A | 11/1949 |
| JP | 2000059382 A | 2/2000 |
| JP | 2004364179 A | 12/2004 |
| JP | 2005529570 A | 9/2005 |
| JP | 2005311653 A | 11/2005 |
| JP | 2007307494 A | 11/2007 |
| JP | 2012204955 A | 10/2012 |
| JP | 2014014047 A | 1/2014 |
| JP | 2015527026 A | 9/2015 |
| JP | 2016504840 A | 2/2016 |
| JP | 2016511997 A | 4/2016 |
| JP | 2017005579 A | 1/2017 |
| JP | 2017092676 A | 5/2017 |
| JP | 2017528962 A | 9/2017 |
| JP | 2018506218 A | 3/2018 |
| JP | 2019500771 A | 1/2019 |
| JP | 2020502883 A | 1/2020 |
| KR | 20130093831 A | 8/2013 |
| TW | 201620257 A | 6/2016 |
| WO | 2014036150 A1 | 3/2014 |
| WO | 2014062714 A1 | 4/2014 |
| WO | 2015086079 A1 | 6/2015 |
| WO | 2015098311 A1 | 7/2015 |
| WO | 2015104802 A1 | 7/2015 |
| WO | 2016180497 A1 | 11/2016 |
| WO | 2017081207 A1 | 5/2017 |
| WO | 2017125747 A1 | 7/2017 |
| WO | 2017171901 A1 | 10/2017 |
| WO | 2017184190 A1 | 10/2017 |
| WO | 2018083649 A1 | 5/2018 |

OTHER PUBLICATIONS

Grobe, Liane, et al., "Block-Based PAM with Frequency Domain Equalization in Visible Light Communications", Globecom 2013 Workshop—Optical Wireless Communications, 2013, pp. 1070-1075.

Kahn, Joseph M., et al., "Wireless Infrared Communications", Proceedings of the IEEE, vol. 85, No. 2, Feb. 1997, pp. 265-298.

Komine, Toshihiko, et al., "Fundamental Analysis for Visible-Light Communication System using LED Lights", IEEE Transactions on Consumer Electronics, vol. 50, No. 1, Feb. 2004, pp. 101-107.

Tsonev, Dobroslav, et al., "Complete Modeling of Nonlinear Distortion in OFDM-Based Optical Wireless Communication", Journal of Lightwave Technology, vol. 31, No. 18, Sep. 15, 2013, pp. 3064-3076.

Zhou, Zimu, et al., "WiFi-Based Indoor Line-of-Sight Identification", IEEE Transactions on Wireless Communications, vol. 14, No. 11, Nov. 2015, pp. 6125-6136.

Wu, Z., et al., "Network solutions for the line-of-sight problem of new multi-user indoor free-space optical system", IET Communications, vol. 6, Issue 5, The Institution of Engineering and Technology, www.ietdl.org, 2012, pp. 525-531.

Benedetto, Francsco, et al., "Dynamic LOS/NLOS Statistical Discrimination of Wireless Mobile Channels", IEEE, 2007, pp. 3071-3075.

Borras, Joan, et al., "Decision Theoretic Framework for NLOS Identification", IEEE, VTC '98, 1998, pp. 1583-1587.

\* cited by examiner

METHODS, APPARATUS AND MACHINE-READABLE MEDIUMS RELATED TO WIRELESS COMMUNICATION IN COMMUNICATION NETWORKS

TECHNICAL FIELD

Embodiments of the disclosure relate to wireless communication in communication networks, and particularly relate to methods, apparatus and machine-readable mediums for wireless communication in a communication network comprising a wireless device, a radio access network node and a wireless light communication network node.

BACKGROUND

Transmission points for wireless radio communication networks are increasingly being equipped with advanced antenna systems. These antenna systems increase the capacity and/or coverage of existing wireless systems by the addition of antenna arrays. This enables the use of beamforming techniques to increase the received signal strength for signals transmitted in and received from a particular direction. Wireless devices are similarly being provided with multi-antenna transceivers. Thus, they are also able to apply beamforming techniques to benefit from beamforming gain in particular directions both for transmitted and received signals.

In order to benefit from beamforming gains, therefore, a transmitting device, whether an Access Point (AP) or a wireless device, should determine an appropriate transmit beam (e.g., shape and/or direction) so as to transmit beams with higher gain in the direction of the receiving device. Similarly, a receiving device, whether an AP or a wireless device, should determine an appropriate receive beam (e.g., shape and/or direction) so as to receive beams with higher gain in the direction of the transmitting device.

This outcome is usually achieved through a process known as beamsweeping, in which the transmitting device transmits beams in all predefined directions, e.g., in a burst and/or at a regular interval. The receiving device performs measurements on those beams using all of its receiving beams, and reports the measurements to the transmitting device so that an appropriate transmit—receive beam pair can be determined. To be certain that the most appropriate beam pair is selected, transmissions and corresponding measurements are performed for all possible transmit—receive beam pairs.

Range and angle (of arrival) measurements can also be part of the previous selection process. Note that the range and angle measurements depend on whether a line-of-sight, LoS, exists between the transmitting and receiving devices. In the case that a LoS exists, the process for determining the range and angle may be considered to be relatively straightforward due to the relative high accuracy for range and angle measurements in the LoS case. However, in the case that a LoS does not exist, for example due to a blockage in the LoS, between the transmitting and receiving devices, a relatively more complex, but less accurate, process may be used for range and angle measurements. Thus, determining whether or not a LoS exists provides an indication of which process should be implemented. Further, one emerging concept of potential interest is where the receiving device may harvest energy from the transmit beam. Such energy harvesting may be more efficient in scenarios where a LoS exists.

Determination of whether or not a LoS exists is considered to be a challenging problem.

One approach for determining whether or not a LoS exists involves implementing a binary hypothesis test. In such a test, one hypothesis corresponds to a scenario where a LoS exists and another hypothesis corresponds to a scenario where a LoS does not exist. In such hypothesis testing, extensive channel measurements are performed, which require valuable time and frequency resources, and involve the use of dedicated channel sounders which require additional hardware circuitry. Additionally, in scenarios where there is mobility in terms of the relative positioning of the transmitting and receiving devices, the accuracy of the hypothesis testing may be decreased compared to the scenario where there is no mobility.

An alternative approach for determining whether or not a LoS exists involves using ultra-wideband signals to measure the delay spread or another range quantity of a received signal. However, use of ultra-wideband signaling is dependent on whether or not the transmitting and receiving devices have the relevant circuitry for handling ultra-wideband signals. Cost constraints and/or the setting of communication standards may impose limitations on the deployment of communication infrastructure with such capabilities.

An alternative approach, which has been discussed in the IEEE 802.11ay standardization task group, relies on the physical properties of a propagating RF signal. For example, in millimeter wave communication in the frequency bands around 60 GHz, a propagating RF signal undergoes a polarization change whenever a reflection occurs. Accordingly, in a LoS propagation path, no polarization change occurs. This reflection-dependent polarization characteristic of the RF signal may be exploited to determine whether or not a LoS exists when multiple redundant reference signals are transmitted with known different polarization states. However, this approach involves the use of additional circuitry and time resources for the transmission of RF signals with different polarization states, as well as for the analysis of the RF received signals Therefore, existing approaches for determining whether or not a LoS exists might involve the use of additional circuitry and/or take up radio resources. If the process for determining whether or not a LoS exists could be simplified, valuable resources might be freed up for other tasks and/or the cost of infrastructure deployment might be reduced.

SUMMARY

Embodiments of the present disclosure seek to address these and other problems.

In one aspect, there is provided a method performed by a node of a wireless communication network, the wireless communication network comprising a wireless device, a radio access network node and one or more wireless light communication, LC, network nodes. At least one of the wireless device and the radio access network node comprise a plurality of antenna elements configurable to provide a transmit or receive beam for communication with the other of the wireless device and the radio access network node. The method comprises obtaining an indication of a wireless LC network node with which the wireless device has established a wireless LC connection. The method further comprises obtaining one or more signal metrics for one or more transmit or receive beams which are directed towards a coverage area of the indicated wireless LC network node, or which are directed to receive transmissions from the coverage area of the indicated wireless LC network node. The method further comprises determining whether or not a transmit or receive beam of the one or more transmit or receive beams corresponds to a line-of-sight, LoS, between the radio access network node and the wireless device based on a comparison between the signal metric for the transmit or receive beam and a first threshold.

Apparatus and non-transitory machine-readable mediums are also provided for performing the method set out above. For example, in one aspect, a node is provided, configured to perform the method (and other methods set out herein). In another aspect, there is provided a node of a wireless communication network. The wireless communication network comprises a wireless device, a radio access network node and one or more wireless light communication, LC, network nodes. At least one of the wireless device and the radio access network node may comprise a plurality of antenna elements configurable to provide a transmit or receive beam for communication with the other of the wireless device and the radio access network node. The node comprises processing circuitry, a non-transitory machine-readable medium and a plurality of antenna elements configurable to provide a plurality of transmit or receive beams. The non-transitory machine-readable medium stores instructions which, when executed by the processing circuitry, cause the node to: obtain an indication of a wireless LC network node with which the wireless device has established a wireless LC connection; obtain one or more signal metrics for one or more transmit or receive beams which are directed towards a coverage area of the indicated wireless LC network node, or which are directed to receive transmissions from the coverage area of the indicated wireless LC network node; and determine whether or not a transmit or receive beam of the one or more transmit or receive beams corresponds to a line-of-sight, LoS, between the radio access network node and the wireless device based on a comparison between the signal metric for the transmit or receive beam and a first threshold.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Embodiments of the disclosure describe methods, apparatus and machine-readable mediums which leverage information obtained regarding a wireless light communication, LC, connection within a communication network to simplify a determination of whether or not a line-of-sight, LoS, exists between radio frequency, RF, transmitting and receiving devices in the communication network. An example of such a communication network is depicted in FIGS. 1a to 1b and described in more detail below.

Figure 1A:
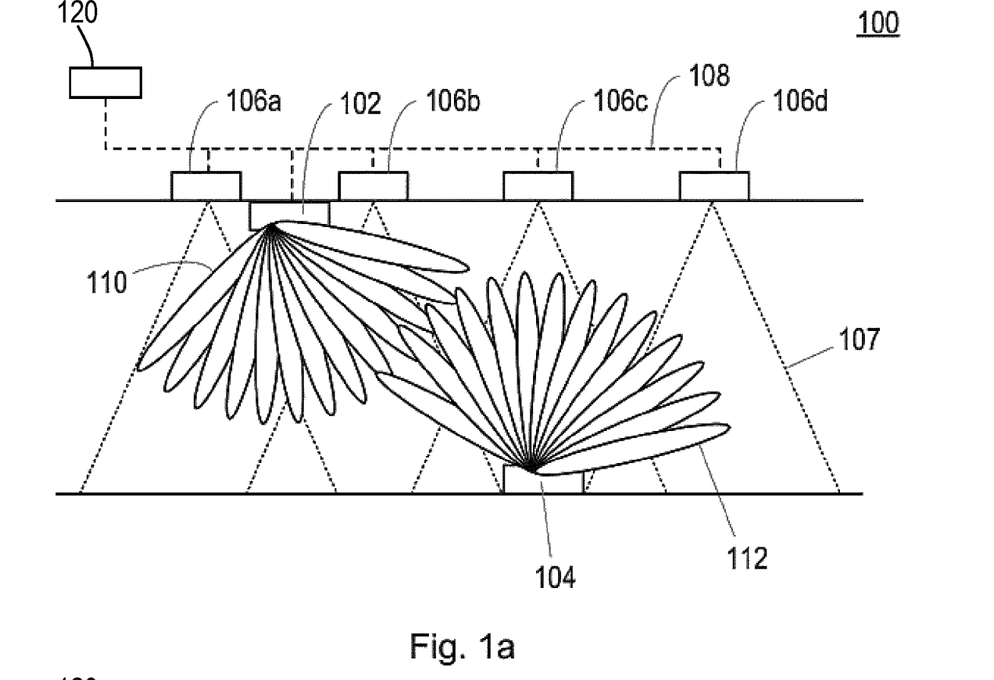
FIGS. 1a and 1b are schematic diagrams showing beamforming in a communication network according to embodiments of the disclosure.
Figure 1B:
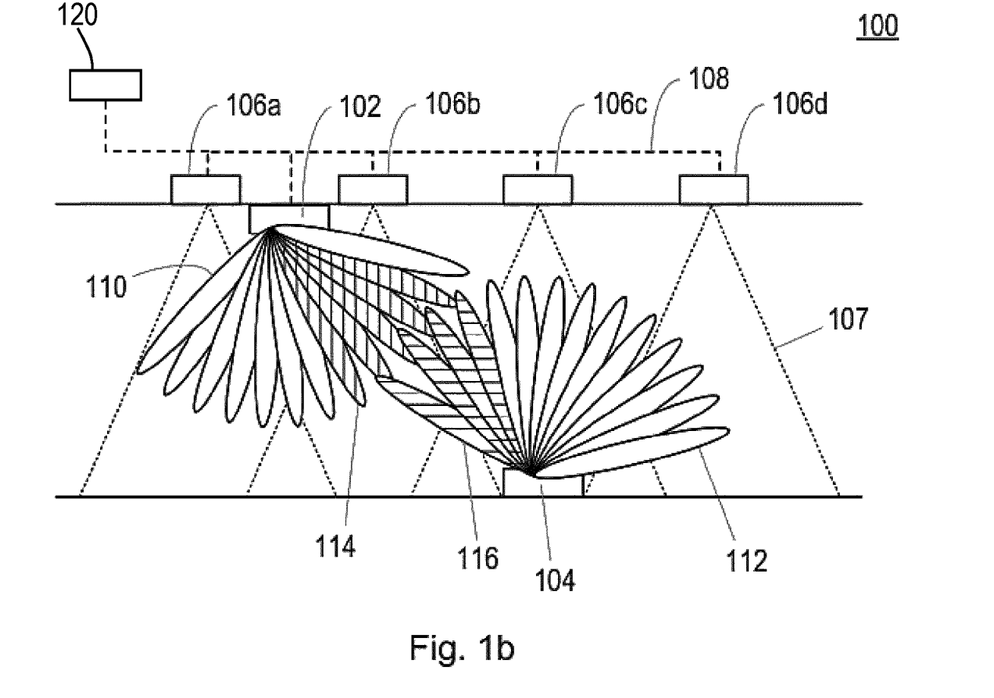

FIG. 1a is a schematic diagram showing a communication network 100 according to embodiments of the disclosure. The illustration shows an example where the network 100 is deployed indoors (with the floor at the bottom of the page and the ceiling at the top); however, those skilled in the art will appreciate that the concepts disclosed herein are applicable to indoor and outdoor environments.

The network 100 comprises a radio access network node 102 and a wireless device 104.

The radio access network node 102 is configured to provide wireless radio access to the wireless device 104 implementing any suitable radio telecommunication standard. For example, the radio access network node 102 may form part of a cellular network, and provide radio access conforming to a cellular network radio standard such as those produced by the $3^{rd}$ Generation Partnership Project (3GPP), e.g., Global System for Mobile Communications (GSM), General Packet Radio Service (GPRS), Enhanced Data Rates for GSM Evolution (EDGE), Universal Mobile Telecommunications System (UMTS), Long Term Evolution (LTE), LTE Advanced, and the 5G standard termed New Radio (N R). Alternatively, the radio access network node 102 may form part of a wireless local area network (WLAN), and provide radio access conforming to the IEEE 802.11 standards, for example. In this latter example, the radio access node may be termed an access point (AP). References to a "radio access network node" herein include at least cellular radio access network nodes and WLAN access points. In the illustrated embodiment, the radio access network node 102 is located on the ceiling; however, it will be understood that the radio access network node 102 may be located at any position.

The wireless device 104 is configured to communicate wirelessly with the radio access network node 102, and thus also implements the same standard as the radio access network node 102. For example, the wireless device 102 may alternatively be termed a user equipment (UE) or a mobile station (STA).

In the illustrated embodiment, the radio access network node 102 and the wireless device 104 each comprise a plurality of antennas or antenna elements (e.g. an antenna array or similar arrangement) for the transmission and/or reception of radio signals. Through the application of beamforming techniques, the radio access network node 102 and the wireless device 104 are thus both able to transmit radio signals having a greater strength and/or to receive radio signals with a higher sensitivity in a particular direction. For example, one or more respective weights or phase-shifts may be applied to signals provided to each antenna element, or received from each antenna element, so that signals from or to a particular direction experience constructive interference while those from other directions experience destructive interference. Those skilled in the art will be well aware of the principles of beamforming techniques.

Various beams are shown in the illustrated example. Those beams used by the radio access network node 102 are given the reference numeral 110, while those used by the wireless device 104 are given the reference numeral 112. The antenna elements may be configurable to provide a plurality of pre-defined beams 110, 112. It will be understood that the beams 110, 112 may be for the transmission or reception of wireless radio signals. For example, in one embodiment the radio access network node 102 is the transmitting device and the wireless device 104 is the receiving device; in this example the beams 110 are therefore transmit beams, while the beams 112 are receive beams. In another example, the wireless device 104 is the transmitting device and the radio access network node 102 is the receiving device; in this example the beams 112 are therefore transmit beams and the beams 110 are receive beams.

Where referring to the transmission of wireless radio signals, the transmitting device may refer to an RF transmitting device and the receiving device may refer an RF receiving device.

In a further example, transmit or receive beams may be utilized by only one of the radio access network node 102 and the wireless device 104, with the other transmitting or receiving radio signals omnidirectionally. Thus one of the radio access network node 102 and the wireless device 104 may transmit a radio signal using a directional beam, while the other of the radio access network node 102 and the wireless device 104 receives the radio signal without using beamforming. Similarly, one of the radio access network node 102 and the wireless device 104 may transmit a radio signal without using beamforming, while the other of the radio access network node 102 and the wireless device 104 receives the radio signal using a receive beam. The description below assumes that a transmit—receive beam pair is determined for the radio access network node 102 and the wireless device 104. However, it will be understood that embodiments of the disclosure also relate to the determination of a transmit or receive beam for just one of the radio access network node 102 and the wireless device 104.

As noted above, in order to benefit from beamforming gains, a transmitting device should determine an appropriate transmit beam (e.g., shape and/or direction) so as to transmit beams with higher gain in the direction of the receiving device. Similarly, a receiving device (whether an access point or a wireless device) should determine an appropriate receive beam (e.g., shape and/or direction) so as to receive beams with higher gain in the direction of the transmitting device. Such devices will typically use a process known as beamsweeping, in which the transmitting device transmits beams in all predefined directions, e.g., in a burst and/or at a regular interval. The receiving device performs measurements on those beams using all of its receiving beams, and reports the measurements to the transmitting device so that an appropriate transmit—receive beam pair can be determined. To be certain that the most appropriate beam pair is chosen, transmissions and corresponding measurements are performed for all possible transmit— receive beam pairs. This process is time consuming, and utilizes significant power and radio resources.

Embodiments of the disclosure utilize an alternative wireless communication technology to determine the location of a receiving device (whether the radio access network node 102 or the wireless device 104) with a reasonable degree of accuracy. The number of transmit and/or receive beams tested as part of a beamsweeping procedure can therefore be reduced, so as to target the known or approximate location of the receiving device.

In particular, embodiments of the disclosure utilize wireless light communication (sometimes referred to as "LiFi"), and thus the network 100 additionally comprises a plurality of wireless light communication network nodes 106a, 106b, 106c, 106d (collectively, 106).

Recent studies in academia and early prototypes from industry have shown that visible light communication (VLC) has the potential to become a new means of wireless communication. This is also the case for the general light communication (LC) which deploys frequencies that do not belong to the visible optical spectrum, such as infrared light. In particular, several gigabits per second (Gb/s) are anticipated from wireless communication systems that utilize the optical spectrum for communication purposes. The main concept behind LC is to communicate binary data using rapidly varying levels of light intensity. In more detail, one or multiple light emitting diodes (LEDs) are deployed in the transmitting source in order to modulate binary data in different levels of emitted light intensity. The deployed LEDs change the levels of the emitted light intensity at rates that are not perceivable by the human eye. Thus, the incorporation of LC in an illumination system does not affect the quality of illumination. The receiving device detects the changes of the emitted light intensity using photo detectors (PDs), for example. In this way, the receiving device is able to detect the transmitted data.

Thus each of the wireless LC network nodes 106 comprises one or more light sources (such as LEDs) for the transmission of light. The light may have a wavelength which is in the visible part of the spectrum, or adjacent to it (e.g., infrared or ultraviolet). The light is subject to modulation with one or more data sources, such that the intensity of the light varies over time in a manner which can be detected and decoded by a receiving device. The line of sight area covered by this light (e.g., a "coverage area") is shown by the dashed lines 107. The wireless device 104 therefore comprises one or more photo detectors for the detection of the modulated light transmitted by the wireless LC network nodes 106, and in this way communications can take place in the downlink from the wireless LC network nodes 106 to the wireless device 104. The wireless device 104 may additionally comprise one or more light sources (such as LEDs), and the wireless LC network nodes 106 may comprise one or more photo detectors, so that communication can also take place in the uplink from the wireless device 104 to the LC network nodes 106.

Annex A below describes how the LC channel is dominated by the line of sight component between the transmitter (e.g., the LC nodes 106) and the receiver (e.g., the wireless device 104). When line of sight no longer exists between the transmitter and the receiver, the SINR of the LC communication link decreases significantly such that almost always a connection between the transmitter and the receiver is no longer viable. Therefore, if a connection is operational between an LC transmitter and an LC receiver, the location of the LC receiver is known with very high degree of certainty; it must be within a line of sight of the LC transmitter. In the context of FIG. 1, if an LC connection exists between a wireless LC node 106 and the wireless device 104, the wireless device 104 must be within the bounds of the transmitted light 107. This area is termed "an LC cell" 107 herein.

The wireless LC network nodes 106 may be independent of each other, providing independent services to wireless devices in a manner akin to separate radio base stations. For example, each wireless LC network node 106 may implement its own respective software protocol stack. Alternatively, the wireless LC network nodes 106 may form part of a larger entity, in a manner akin to different transmission—reception points of a radio base station. For example, each wireless LC network node 106 may implement one or more lower layers of a protocol stack, with a separate network entity implementing the higher layers for multiple wireless LC network nodes 106.

It will further be noted that the wireless LC nodes 106 are communicatively coupled to the radio access network node 102 via a backhaul connection 108. The backhaul connection 108 will typically be a wired connection, such as an Ethernet connection (e.g., power over Ethernet) or other packet data connection, although in certain embodiments the connection 108 may alternatively be wireless.

The communication network 100 further comprises a communication network node 120 communicatively coupled to the other nodes 102, 106 in the communication network 100 via the backhaul connection 108. The communication network node 120 may be embodied in the hardware and/or software of a standalone server, a cloud-implemented server, a distributed server or as processing resources in a server farm. The communication network node 120 may be under the ownership or control of a service provider, or may be operated by the service provider or on behalf of the service provider.

The radio access network node 102 obtains information identifying an LC cell 107 or wireless LC network node 106 to which the wireless device 104 is connected. Based on that information, the radio access network node 102 is able to select a subset of the beams 110 which it is capable of producing, and to initiate a beamsweeping procedure using just that subset of beams to select a transmit or receive beam for communicating with the wireless device 104. Similarly, the wireless device 104 connects to an LC cell 107 or wireless LC network node 106 and, based on the LC cell or wireless LC network node 106, identifies a subset of the transmit or receive beams which it is capable of producing and performs a beamsweeping procedure using the subset of beams to select a transmit or receive beam for communicating with the radio access network node 102.

FIG. 1b shows the network 100 described above, once the selection of the subset of transmit or receive beams has taken place. In this example, the wireless device 104 establishes a connection with the wireless LC node 106c. Information identifying the wireless LC network node 106c or the LC cell 107 formed by it is provided to the radio access network node 102 (e.g., via the backhaul connection 108, or from a communication by the wireless device 104 itself), and the radio access network node consequently identifies beams 114 (a subset of the beams 110) which target just the cell 107. Similarly, the wireless device 104 identifies beams 116 (a subset of the beams 112) which target the radio access network node 102 from the identified cell 107. A beamsweeping procedure using just these subsets of beams 114, 116 may involve less time and resources to complete.

As referred to previously, in the context of FIG. 1b, if a wireless LC connection has been established between a wireless LC node 106 and the wireless device 104, the wireless device 104 is determined to be within the bounds of the LC cell 107. Accordingly, it is possible to determine an approximate location of the wireless device 104 relative to the radio access network node 102. Based on this knowledge regarding the approximate location, it may be possible to simplify a determination of whether or not a LoS exists between an RF transmitting device (e.g., one of the radio access network node 102 and the wireless device 104) and an RF receiving device (e.g., the other one of the radio access network node 102 and the wireless device 104).

If the wireless LC network nodes 106 have a predictable mobility, or have a very low or no mobility, their location may be determined so that the approximate location of the wireless device 104 can be determined based on the known or established location of the respective wireless LC network node 106 to which the wireless device 104 is connected.

The process for identifying a subset of the transmit or receive beams 110, 112 may be simplified by selecting the beams 114 (e.g., a subset of the beams 110) which target the determined approximate location of the wireless device 104 within the cell 107. Similarly, the wireless device 104 may identify the beams 116 (e.g., a subset of the beams 112) which target the radio access network node 102 from the identified cell 107.

One or more candidate transmit or receive beams 110, 112 selected from the identified beam subsets 114, 116 corresponding to a LoS between the transmitting device and receiving device may be identified. Measurements may be performed to determine a signal metric for the identified candidate transmit or receive beams 110, 112. This signal metric may then be compared with a threshold to determine whether or not a LoS exists.

If a determination is made that a LoS exists, it is then possible to perform range and angle (of arrival) measurements between the transmitting and receiving devices as part of a procedure to establish RF communication. On the other hand, if a determination is made that a LoS does not exist, or that a non-LoS, NLoS, transmit or receive beam 110, 112 is dominant, further analysis may be undertaken before determining whether or not RF communication can be established via the NLoS transmit or receive beam 110, 112. A non-existent LoS or dominant NLoS transmit or receive beam 110, 112 may be indicative that there is a blockage in the LoS path between the transmitting and receiving devices or that the orientation of the wireless device 104 is not optimal for supporting a LoS transmit or receive beam 110, 112. Once it has been established whether or not a LoS exists, or at least whether a LoS or NLoS transmit or receive beam 110, 112 is dominant, the most appropriate procedure for establishing RF communication can be identified. These procedures are now described in more detail below.

Figure 2:
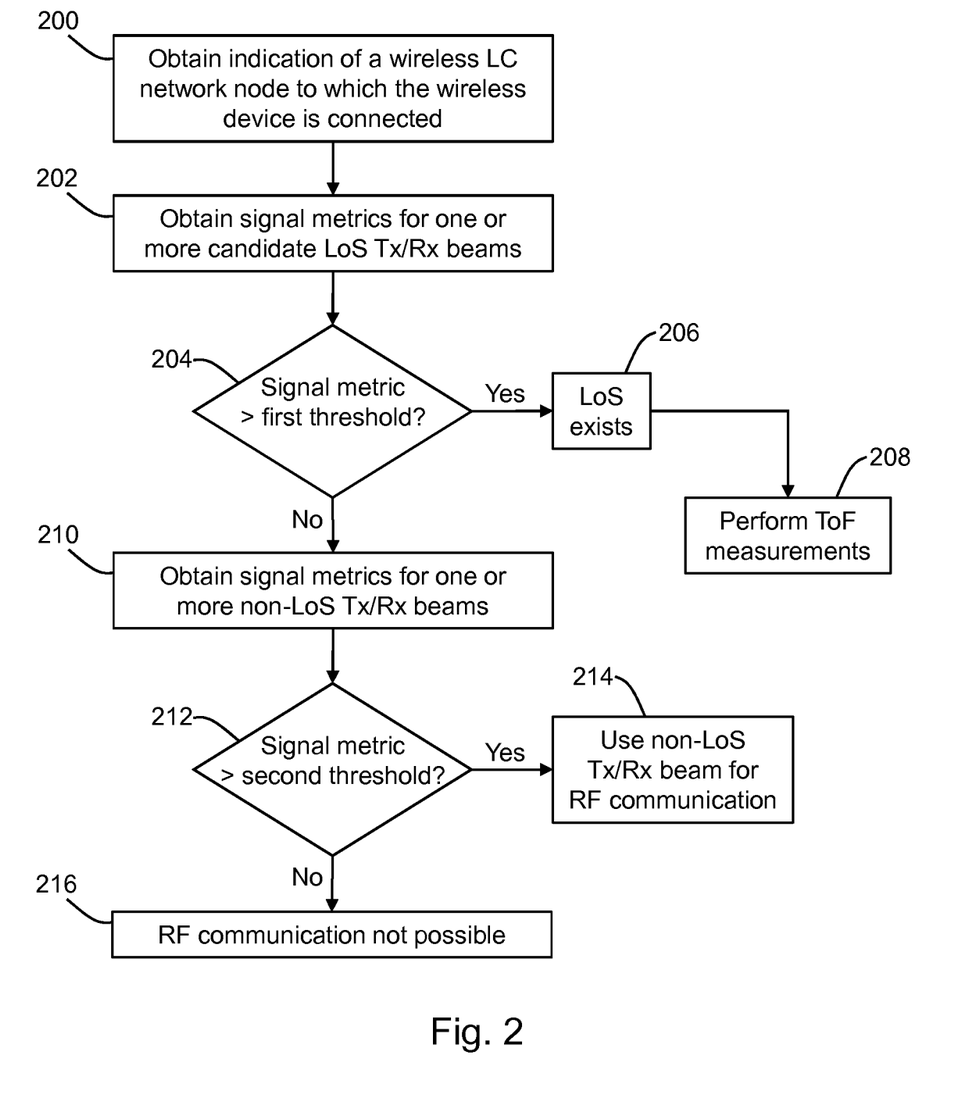
FIG. 2 is a flowchart of a method performed by a node according to embodiments of the disclosure.

FIG. 2 is a flowchart of a method according to embodiments of the disclosure. The method may be performed by a node of a wireless communication network (100) such as depicted by FIGS. 1a and 1b. The node may comprise the radio access network node 102, the wireless device 104 and/or the communication network node 120 described above with respect to FIGS. 1a and 1b. Thus, any reference to a method performed by a node may refer to a method performed by any of the nodes 102, 104, 120.

The method comprises, in block 200, obtaining an indication of a wireless LC network node 106 with which the wireless device 104 has established a wireless LC connection. Such an indication may be obtained if it is determined that a wireless LC connection is presently established or has previously been established between the wireless device 104 and the wireless LC network node 106. This determination that a wireless LC connection has established may be made by any nodes providing the wireless LC connection (i.e., the wireless device 104 or the radio access network node 102) or any nodes communicatively coupled thereto (e.g., the communication network node 120).

The indication may be obtained may be obtained in various ways. For example, the indication may be obtained by receiving a message from the wireless device 104 comprising the indication of the wireless LC network node 106, and/or by receiving a message from the wireless LC network node 106 comprising the indication of an identity of the wireless device 104. If the indication provided by one of the wireless device 104 and the radio access network node 102 comprises an identity of or any other information regarding the other of the wireless device 104 and the radio access network node 102, this may be indicative that these nodes are or have been communicatively coupled to each other using a wireless LC connection.

The method further comprises, in block 202, obtaining one or more signal metrics for one or more candidate transmit or receive beams 110, 112 ("transmit or receive" is denoted "Tx/Rx" in the figure) which are directed towards a coverage area of the indicated wireless LC network node 106, or which are directed to receive transmissions from the coverage area of the indicated wireless LC network node 106. The transmit or receive beams 110, 112 which are directed towards, or directed to receive transmissions from, the coverage area of the indicated wireless LC network node 106 may be considered to be potential candidate beams for a LoS transmit or receive beam 110, 112 between the transmitting and receiving devices.

Obtaining the one or more signal metrics may comprise performing measurements on signals transmitted or received using the one or more transmit or receive beams 110, 112 to obtain respective values for the signal metric for each of the one or more transmit or receive beams 110, 112. The signal metric may comprise one or more of: received signal strength; received signal power; received signal quality; signal-to-noise ratio; and signal-to-noise-and-interference ratio.

As referred to above, a subset of the plurality of transmit or receive beams 110,112 may be identified as potentially targeting the determined approximate location of the wireless device 104 within the cell 107, or which target the radio access network node 102 from the identified cell 107. For example, one or more signal metrics may be obtained for a subset of the plurality of pre-defined transmit or receive beams 110, 112. For example, the subset of pre-defined transmit or receive beams may correspond to those transmit beams which are directed towards a coverage area of the indicated wireless LC network node, or those receive beams which are directed to receive transmissions from the coverage area of the indicated wireless LC network node 106.

The plurality of transmit or receive beams 110, 112 may be defined by one or more of: a plurality of analog beamformers; a plurality of analog combiners; a digital codebook of beamformers; and a digital codebook of combiners. These concepts are discussed in more detail in Annex A below.

The method further comprises determining whether or not a transmit or receive beam of the one or more transmit or receive beams 110, 112 corresponds to a LoS between the radio access network node 102 and the wireless device 104 based on a comparison, in block 204, between the signal metric for the transmit or receive beam 110, 112 and a first threshold. Depending on how the obtained one or more signal metrics for the candidate LoS transmit or receive beam 110, 112 compares with the first threshold, a determination may be made as to whether or not a LoS exists. For example, where the signal metric varies positively with the strength or quality of the signal (e.g., signal-to-noise ratio received signal strength or power, etc), and the signal metric is determined to be above the first threshold, this may be indicative of the existence of a LoS.

Various factors may be taken into account when establishing the first threshold. For example, the distance between the wireless device 104 and the radio access network node 102 (e.g., based on the approximate location of the wireless device 104) may affect the RF power received from the transmitting device. The first threshold may be determined based on a determination of the range (e.g., estimated distance) between the wireless device 104 and the radio access network node 102. For example, the threshold may be calculated based on the distance between the wireless device 104 and the radio access network node 102 and the equation for RF propagation in free space (i.e., Friis's equation). The first threshold may be set at a value which is just below the expected value if a LoS exists between the wireless device 104 and the radio access network node 102 (e.g., 80% or 90% of that expected value).

The first threshold may be further determined according to a capability of the wireless device 104 and the radio access network node 102. For example, the wireless device 104 may have certain RF power transmission capabilities (such as a maximum transmit power), which might influence the RF signal power that might be received by the radio access network node 102, and vice versa.

The first threshold may be calculated dynamically (e.g., based on Friis's equation), or using one or more predetermined values (e.g., in a look-up table or similar). In the latter case, particular threshold values may be predetermined for particular distances (or ranges or distances) between the wireless device 104 and the radio access network node 102, for example.

If it is established, at block 206, that a LoS exists, certain procedures may then be carried out using the LoS transmit or receive beam. For example, the method may further comprise, at block 208, utilizing a LoS transmit or receive beam 110, 112 to perform time-of-flight, ToF, measurements between the wireless device 104 and the radio access network node 102. These ToF measurements may be used to provide an accurate determination of the distance between the wireless device 104 and the radio access network node 102.

However, if it is established that a LoS does not exist (e.g., none of the candidate beams has a signal metric which compares favourably to the first threshold), the method may proceed to block 210 in which the node obtains one or more signal metrics for one or more transmit or receive beams 110, 112 not directed towards, or to receive transmissions from, the coverage area of the indicated wireless LC network node 106. These beams may be termed non-LoS (NLoS) herein. Block 210 of the method may be performed responsive to a determination that no LoS exists between the radio access network node 102 and the wireless device 104.

At block 212, the obtained signal metrics (for both candidate LoS and NLoS beams) may be compared with a second threshold to determine whether RF communication can be established between the transmitting and receiving devices using the beams 110, 112. Depending on how the obtained signal metrics compare with the second threshold, a determination may be made as to whether or not it is possible to use the respective beams (e.g., the candidate LoS and the NLoS transmit or receive beam 110, 112) for RF communication. For example, if the signal metric is above the second threshold then, at block 214, a determination may be made to use the respective beam 110, 112 for RF communication. On the other hand, if the signal metric is not above the second threshold then, at block 216, a determination may be made that RF communication is not possible using the respective beam 110, 112.

In this way one or multiple beams may be selected for communication between the wireless device 104 and the radio access node 102. The method may further comprise comparing the signal metrics for each beam (candidate LoS and NLoS) with each other to determine which of the beams is dominant (e.g., which of the beams is the strongest). This dominant beam, or a particular number of the strongest beams, may be selected for communication between the wireless device 104 and the radio access node 102.

The second threshold may be determined as a minimum value at which RF communication is possible or reliable.

Embodiments of this disclosure therefore provide a simplified method for determining whether or not there is an obstacle between the transmitting and receive device and/or whether a candidate transmit or receive beam 110, 112 can be used for establishing RF communication. The method may allow a determination to be made as to whether or not a LoS exists.

Embodiments described herein may simplify the procedure for establishing whether or not a LoS exists such that fewer computing resources and/or time may need to be dedicated for determining which transmit or receive beam 110, 112 to use for RF communication. For example, embodiments may avoid or reduce the need for highly accurate statistical models for determining whether or not a LoS exists since information regarding the approximate location of the wireless device 104 may be readily established via a LC network-based positioning service. By determining whether or not a LoS exists, it may also be possible to determine the identity of the dominant transmit or receive beam (e.g., whether LoS or NLoS). The hardware and/or software required for performing the measurements for determining the one or more signal metrics may be reduced compared with some techniques for determining whether or not a LoS exists.

As will be described in more detail below, embodiments of the disclosure may be applicable to either codebook based transmission or non-codebook based transmission.

Codebook Based Transmission

In the case of codebook based transmission, the existence of a dominant LoS transmit or receive beam 110, 112 may facilitate an accelerated beam-sweeping process. This accelerated beam-sweeping process is undertaken by using the knowledge of the approximate location and orientation of the wireless device 104 relative to the radio access network node 102.

As referred to above and as discussed in more detail in Annex A, a beam-sweeping process between the radio access network node 102 and the wireless device 104 may involve the use of a codebook (e.g., digital codebook) of transmit beamformers (e.g., transmit beams), $\mathcal{B} = \{B_1, \ldots, B_{|\mathcal{B}|}\}$ and a codebook (e.g., digital codebook) of receiver combiners (e.g., receive beams), $\mathcal{R} = \{R_1, \ldots, R_{|\mathcal{R}|}\}$. Since the radio access network node 102 may be informed of the approximate location of the wireless device 104 (e.g., due to the positioning services offered by the wireless LC access network nodes 106) and the wireless device 104 may be aware of its own orientation (e.g., via on-board sensors such as a gyroscope, accelerometer, etc) and may be informed of the location of the radio access network node 102, it is possible to define subsets 114, 116 of the transmit or receive beams, $\mathcal{B}_{Los} \subset \mathcal{B}$ and $\mathcal{R}_{Los} \subset \mathcal{R}$, which correspond to the transmit or receive beams 110, 112, respectively, that point towards the direction of a possible LoS between the wireless device 104 and the radio access network node 102. In other similar words, the subsets 114, 116 may correspond to candidate LoS transmit or receive beams 110, 112.

Similarly, a NLoS transmit beam subset, $\mathcal{B}_{NLoS} = \mathcal{B} \setminus \mathcal{B}_{Los}$ (i.e., those transmit beams not within the subset $\mathcal{B}_{Los}$) and a NLoS receive beam subset, $\mathcal{R}_{NLoS} = \mathcal{R} \setminus \mathcal{R}_{Los}$ (i.e., those receive beams not within the subset $\mathcal{R}_{Los}$) may be defined. These subsets correspond to the transmit or receive beams 110, 112 which represent NLoS directions. In the case where there is no obstacle between the wireless device 104 and the radio access network node 102, one transmit beam selected from $\mathcal{B}_{Los}$ and one receive beam selected from $\mathcal{R}_{Los}$ may be identified as corresponding to a dominant LoS transmit or receive beam 110, 112. As part of the process for determining whether or not a LoS exists, a beam sweeping process may be initiated using the smaller codebooks $\mathcal{B}_{Los}$ and $\mathcal{R}_{Los}$. During this process, which specifies $|\mathcal{B}_{Los}||\mathcal{R}_{Los}|$ time slots, a metric of interest (e.g., one or more signal metrics) is determined for every possible pair of transmit beams selected from the subset $\mathcal{B}_{Los}$ and receive beams selected from the subset $\mathcal{R}_{Los}$. An example signal metric may be SNR, in which case, the first threshold may be defined according to the well-known Friis equation and the approximate RF transmission distance between the wireless device 104 and the radio access network node 102.

If the optimal signal metric (e.g., a maximum value for the SNR), which is determined from the optimal pair of transmit or receive beams 110, 112, is above the first threshold, then it may be concluded that there is a dominant LoS transmit or receive beam 110, 112 without any obstacle in the LoS. In addition, the direction of the dominant LoS transmit or receive beam 110, 112 may be obtained directly from the directions of the optimal pair of transmit and receive beams 110, 112. In contrast, if there is an obstacle in the LoS between the wireless device 104 and the radio access network node 102, the signal metric (e.g., SNR) between all pairs of transmit or receive beams selected from the subsets $\mathcal{B}_{Los}$ and $\mathcal{R}_{Los}$ may be below the first threshold. In this case, it can be concluded that there is no dominant LoS transmit or receive beam 110, 112, or that no LoS exists.

If it is determined that there is no dominant LoS transmit or receive beam 110, 112, or that no LoS exists, a procedure may be performed to determine whether or not there is a dominant NLoS transmit or receive beam 110, 112. In this regard, an additional beam sweeping process which involves the subsets $\mathcal{B}_{NLoS}$ and $\mathcal{R}_{NLoS}$ may be performed to determine whether RF communication can be established using a NLoS transmit or receive beam 110, 112. In a similar manner as described in relation to the LoS case, in $|\mathcal{B}_{NLoS}||\mathcal{R}_{NLoS}|$ time slots, measurements are performed on all possible pairs of transmit or receive beams 110, 112 to determine a signal metric (e.g., SNR) for each of the possible pairs. If the signal metric of an optimal pair (e.g., the dominant NLoS pair) of transmit or receive beams 110, 112 is above the second threshold, then it may be possible to establish RF communication using the identified pair of NLoS transmit or receive beams 110, 112. This process may therefore provide an estimate of the direction of the NLoS transmit or receive beams 110, 112. The accuracy of this estimate may depend on the granularity of the subsets $\mathcal{B}_{NLoS}$ and $\mathcal{R}_{NLoS}$. In other similar words, if the size of the subsets $\mathcal{B}_{NLoS}$ and $\mathcal{R}_{NLoS}$ is relatively large, the process for determining the dominant NLoS pair may yield a relatively accurate result for the direction estimate but may come at a cost in terms of processing time. Conversely, a relatively less accurate result may be obtained, but more quickly, if the size of the subsets $\mathcal{B}_{NLoS}$ and $\mathcal{R}_{NLoS}$ is relatively small. In the case that the optimal pair from $\mathcal{B}_{NLoS}$ and $\mathcal{R}_{NLoS}$ is determined to have a signal metric below the second threshold, then it can be concluded that there is no dominant NLoS transmit or receive beam 110, 112, and accordingly it may not be possible to establish RF communication using the transmit or receive beams 110, 112 analysed so far.

There may be some scenarios where there are optimal pairs of LoS and NLoS transmit or receive beams 110, 112 with the NLoS pair being dominant over the LoS pair. Such a scenario may occur when the orientation of the wireless device 104 prohibits all of its available receive combiners from being pointed toward a LoS direction. In this scenario, the signal metric for the complete codebooks $\mathcal{B}$ and $\mathcal{R}$ may be determined. The identification of the optimal pair of transmit or receive beams 110, 112 may be obtained by comparing the signal metric of the pairs of transmit or receive beams from $\mathcal{B}_{LoS}$ and $\mathcal{R}_{LoS}$, and, $\mathcal{B}_{NLoS}$ and $\mathcal{R}_{NLoS}$ The optimal signal metric value (e.g., highest SNR) obtained from all of the transmit or receive beams 110, 112 tested may be indicative that the particular transmit or receive beam 110, 112 is dominant. RF communication may then be established provided the signal metric is above a threshold (e.g., either the first or second threshold).

Non-Codebook Based Transmission

In the case of non-codebook based transmission, similar principles may be applied to those described above in relation to the codebook based transmission. However, one difference is that a transmitting or receiving device (e.g., the wireless device 104 or the radio access network node 102) designs a transmit beamforming matrix $P_k$ as defined in equation (13) in Annex A and the receive combining matrix $W_k$ in equation (14) in Annex A based on a non-codebook based approach instead of selecting the matrices from pre-defined codebooks. This process may be implemented either independently or jointly in the two communicating nodes (i.e., the wireless device 104 and the radio access network node 102) using a form of channel knowledge. The following description refers to the design of the transmit beamformer and receive combiner being implemented independently. However, for a joint design of the matrices, the design process may be the same but the coordination between the wireless device 104 or the radio access network node 102 may be more involved than in the independently designed implementation.

Using the obtained location of the wireless device 104 as described previously, the radio access network node 102 may design a non-codebook based beamformer (e.g., transmit beam) which corresponds to a candidate LoS direction. Using the known location of the radio access network node 102 with respect to its own approximate location and its knowledge of its own orientation (e.g., obtained via onboard sensors), the wireless device 104 can design a receive combiner (e.g., receive beam) which corresponds to a candidate LoS direction.

During a specified time slot, by measuring and comparing a signal metric (e.g., SNR) with a first threshold, the wireless device 104 or radio access network node 102 may determine whether or not the candidate LoS transmit or receive beam 110, 112 is indicative of whether or not there is an obstacle in the LoS and/or whether or not RF communication can be established. If it is desired to obtain a more accurate estimation of the direction of the dominant LoS component, then the above process may be repeated for a number of different pairs of non-codebook based designed transmit or receive beams 110, 112 which correspond to a candidate LoS direction. In this case, the pair of transmit or receive beams 110, 112 which obtains an optimal signal metric value (e.g., the highest SNR) defines the direction of the dominant LoS transmit or receive beam 110, 112.

If the initially identified pair of transmit or receive beams 110, 112 do not yield a signal metric that is above the first threshold (e.g., an insufficient SNR), it may be concluded that there is an obstacle between the wireless device 104 and the radio access network node 102. The above process may be repeated until the signal metrics for all candidate LoS directions are checked. If there is at least one pair of transmit or receive beams 110, 112 which is above the first threshold, then it can be concluded that this pair is a dominant LoS transmit or receive beam 110, 112. The pair can be identified as the first pair which satisfies the signal metric (e.g., a sufficiently high SNR). Alternatively, for a potentially greater degree of accuracy, the direction of the dominant LoS transmit or receive beam 110, 112 may be obtained from the transmit or receive beam 110, 112 with an optimal signal metric value (e.g., highest SNR) as identified from a plurality of different pairs of transmit or receive beams 110, 112.

If all candidate LoS transmit or receive beams 110, 112 have signal metric values that are below the first threshold, it can be concluded that there is no dominant LoS transmit or receive beam 110, 112, or that no LoS exists. In this scenario, it may be appropriate to obtain information regarding the NLoS transmit or receive beams 110, 112. A similar process to that described above may be utilized to design non-codebook based transmit or receive beams 110, 112 which correspond to NLoS directions. If all pairs of transmit or receive beams 110, 112 which correspond to NLoS directions are determined to have signal metric values below a second threshold, it may be concluded that RF communication cannot be established using the transmit or receive beams 110, 112 tested so far. However, if the signal metric value for at least one pair is above the second threshold, RF communication may be established.

There may be a scenario where both a LoS and a NLoS transmit or receive beam 110, 112 is available but the NLoS transmit or receive beam is dominant. Such a scenario may occur if the codebook of the wireless device 104 or its non-codebook based designed transmit or receive beam 110, 112 is unable to point towards a LoS direction due to its orientation. In such case, the signal metric for a NLoS transmit or receive beam 110, 112 might be considered to be optimal over a corresponding signal metric obtained from a LoS transmit or receive beam 110, 112 (e.g., the SNR for the NLoS transmit or receive beam 110, 112 may be higher). In order to establish which pair is optimal, both for codebook based and non-codebook based transmission, the node may determine the signal metric for all possible combinations of transmit or receive beams 110, 112 which correspond to both LoS and NLoS directions. This process may establish whether the LoS or NLoS transmit or receive beam 110, 112 is dominant and provide an estimation of the direction of the dominant transmit or receive beam 110, 112.

The identification and evaluation of a candidate LoS transmit or receive beam 110, 112 is described as being performed prior to the identification and evaluation of any NLoS transmit or receive beam 110, 112. However, in an alternative implementation this sequence may be reversed so that the NLoS transmit or receive beams 110, 112 are identified and evaluated prior to the identification and evaluation of the LoS transmit or receive beams 110, 112. This alternative sequence may be useful in scenarios where there is prior knowledge of the absence of a LoS, or at least that a LoS transmit or receive beam 110, 112 is not dominant.

Figure 3:
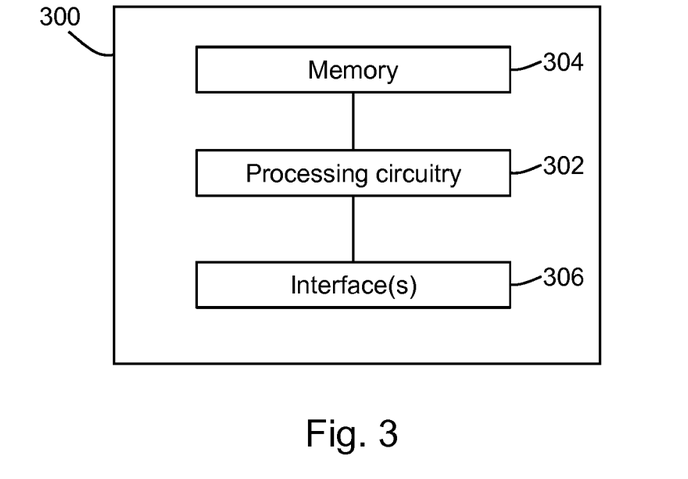
FIGS. 3 and 4 are schematic diagrams of a node according to embodiments of the disclosure.

FIG. 3 is a schematic diagram of a node 300 according to embodiments of the disclosure. The node 300 may be configured to perform the method described above with respect to FIG. 2. The node 300 may be a wireless device, radio access network node or a communication network node.

The node 300 comprises processing circuitry 302 (such as one or more processors, digital signal processors, general purpose processing units, etc), a machine-readable medium 304 (e.g., memory such as read-only memory (ROM), random-access memory, cache memory, flash memory devices, optical storage devices, etc) and one or more interfaces 306. The one or more interfaces 306 may comprise a plurality of antenna elements configurable to provide a plurality of transmit or receive beams. The interfaces 306 may additionally comprise an interface for backhaul communications, such as a wireless, wired (e.g., power-over-Ethernet) or optical interface. The components are illustrated coupled together in series; however, those skilled in the art will appreciate that the components may be coupled together in any suitable manner (e.g., via a system bus or suchlike).

The node 300 is operable in a wireless communication network comprising a wireless device, a radio access network node and one or more wireless light communication (LC) network nodes. According to embodiments of the disclosure, the machine-readable medium 304 stores instructions which, when executed by the processing circuitry 302, cause the node 300 to: obtain an indication of a wireless LC network node with which the wireless device has established a wireless LC connection; obtain one or more signal metrics for one or more transmit or receive beams which are directed towards a coverage area of the indicated wireless LC network node, or which are directed to receive transmissions from the coverage area of the indicated wireless LC network node; and determine whether or not a transmit or receive beam of the one or more transmit or receive beams corresponds to a line-of-sight, LoS, between the radio access network node and the wireless device based on a comparison between the signal metric for the transmit or receive beam and a first threshold.

In further embodiments of the disclosure, the node 300 may comprise power circuitry (not illustrated). The power circuitry may comprise, or be coupled to, power management circuitry and is configured to supply the components of node 300 with power for performing the functionality described herein. Power circuitry may receive power from a power source. The power source and/or power circuitry may be configured to provide power to the various components of node 300 in a form suitable for the respective components (e.g., at a voltage and current level needed for each respective component). The power source may either be included in, or external to, the power circuitry and/or the node 300. For example, the node 300 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 4:
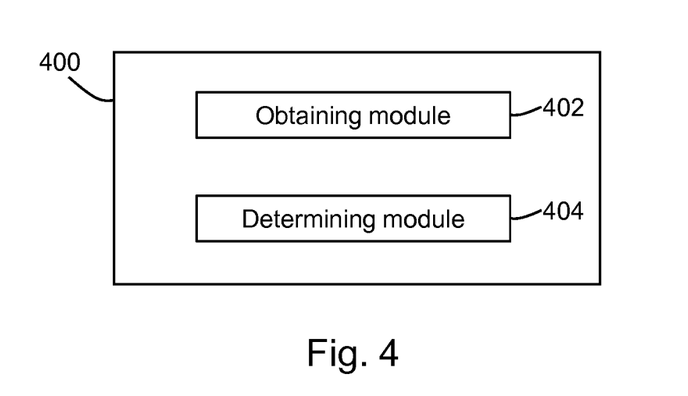

FIG. 4 is a schematic diagram of a node 400 according to embodiments of the disclosure. The node 400 may be configured to perform the method described above with respect to FIG. 2. The node 400 may be a wireless device, radio access network node or a communication network node.

The node 400 comprises an obtaining module 402 and a determining module 404. The node 400 may additionally comprise one or more interfaces (not illustrated). The one or more interfaces may comprise a plurality of antenna elements configurable to provide a plurality of transmit or receive beams. The interfaces may additionally comprise an interface for backhaul communications, such as a wireless, wired (e.g., power-over-Ethernet) or optical interface.

The node 400 is operable in a wireless communication network comprising a wireless device, a radio access network node and one or more wireless light communication (LC) network nodes. According to embodiments of the disclosure, the obtaining module 402 is configured to obtain an indication of a wireless LC network node with which the wireless device has established a wireless LC connection. The obtaining module 402 is further configured to obtain one or more signal metrics for one or more transmit or receive beams which are directed towards a coverage area of the indicated wireless LC network node, or which are directed to receive transmissions from the coverage area of the indicated wireless LC network node. The determining module 404 is configured to determine whether or not a transmit or receive beam of the one or more transmit or receive beams corresponds to a line-of-sight, LoS, between the radio access network node and the wireless device based on a comparison between the signal metric for the transmit or receive beam and a first threshold.

It should be noted that the above-mentioned embodiments illustrate rather than limit the concepts disclosed herein, and that those skilled in the art will be able to design many alternative embodiments without departing from the scope of the appended following statements. The word "comprising" does not exclude the presence of elements or steps other than those listed in a statement, "a" or "an" does not exclude a plurality, and a single processor or other unit may fulfil the functions of several units recited in the statements. Any reference signs in the statements shall not be construed so as to limit their scope.

Annex A

Point-to-Point Light Communication

Recent studies in academia and early prototypes from industry have shown that Visible Light Communication (VLC) has the potential to become a new means of indoor wireless communication. This is also the case for the general Light Communication (LC) which deploys frequencies that do not belong to the visible optical spectrum, such as infrared light. In particular, several Gigabits per Second (Gb/s) are anticipated from wireless communication systems that utilize the optical spectrum for communication purposes.

The main concept behind LC is to communicate binary data using rapidly varying levels of light intensity. In more detail, one or multiple light-emitting diode (LEDs) are deployed by the transmitting source in order to modulate binary data in different levels of emitted light intensity. The deployed LEDs change the levels of the emitted light intensity at rates which are not perceivable by the human eye. Thus, the incorporation of LC in an illumination system does not affect the quality of illumination. The receiving device detects the changes of the emitted light intensity using, for example, photo detectors (PDs), and in this way, the receiving device is able to detect the transmitted binary data. As implied before, due to the nature of the optical channel, the use of intensity modulation (IM) with direct detection (DD) is used (see, for example, a paper by Kahn and Barry, "Wireless Infrared Communications", Proceedings of the IEEE, vol 85, pp 265-298). This means that the transmitted/received signal has to be real and strictly positive. This imposes certain constraints in the deployed communication techniques, both in single and multi-carrier transmission. However, due to the relative large physical area of a PD compared to the carrier wavelength, multipath fading is absent. Therefore, LC may use less complex signal-processing techniques.

Assuming a point-to-point LC system with $N_t$ transmitting LEDs and $N_r$, receiving PDs, the optical channel, in the time domain, between the i-th PD, i=1, ..., $N_r^{LC}$, and the j-th LED, j=1, ..., $N_t^{LC}$ is given as:

$$h_{i,j}^{LC}(t) = h_{i,j}^{LOS} + h_{i,j}^{NLOS}(t), \tag{1}$$

where, $h_{i,j}^{LOS}$, represents the Line-of-Sight (LoS) component, while, $h_{i,j}^{NLOS}(t)$, represents the diffuse component. In the academic literature, the LoS component $h_{i,j}^{LOS}$ is also referred as the Direct Current (DC) component. The diffuse component $h_{i,j}^{NLOS}(t)$ is the aggregate result of multiple light reflections from the surrounding surfaces. In (1), $h_{i,j}^{LOS}$ represents the LOS optical gain, which is given as:

$$h_{i,j}^{LOS} = \begin{cases} \frac{A(k+1)}{2\pi d_{i,j}^2}\cos^k(\phi_{i,j})\cos(\psi_{i,j}), & 0 \leq \psi_{i,j} \leq \Psi_{\frac{1}{2}} \\ 0, & \psi_{i,j} \geq \Psi_{\frac{1}{2}}, \end{cases} \quad (2)$$

where, A represents the area of each PD and k is the Lambertian factor which denotes the directionality order. The Lambertian factor k is given as:

$$k = -\frac{\ln(2)}{\ln\left(\cos\left(\Phi_{\frac{1}{2}}\right)\right)} \quad (3)$$

with, $$\Phi_{\frac{1}{2}}$$

being the transmitter semi-angle. Furthermore, d is the distance between the i-th PD and the j-th LED. The angles $\phi_{i,j}$ and $\psi_{i,j}$ denote the angle of emission of the j-th LED to the i-th PD with respect to the transmitter plane and the angle of incidence of the light at the i-th PD from the j-th LED with respect to the orthonormal vector of the receiver plane of the i-th PD, respectively. The field of view (FOV) semi-angle of each PD is denoted as $$\Psi_{\frac{1}{2}}.$$

Given that the LEDs and PDs are placed in a three-dimensional space, their spatial positions can be described by their Cartesian coordinates. Thus, the angle $\phi_{i,j}$ and $\psi_{i,j}$ can be computed as:

$$\phi_{i,j} = \arccos\left(\frac{\text{dot}(o_t^j, p_r^i - p_t^j)}{d_{i,j}}\right), \text{ and,} \quad (4)$$

$$\psi_{i,j} = \arccos\left(\frac{\text{dot}(o_t^j, p_r^i - p_t^j)}{d_{i,j}}\right). \quad (5)$$

In (5) and (4), $\text{dot}(x,y)=x^T y$, represents the inner product between the vectors x and y. Also, $p_t^j$ and $p_r^i$ are 3×1 vectors which represent the Cartesian coordinates of the j-th LED, j=1, ..., $N_t^{LC}$, and, i-th PD, i=1, ..., $N_r^{LC}$, respectively. The orientation of the j-th LED, j=1, ..., $N_t$, is given from the 3×1 orthonormal vector, $o_t^j$, which is vertical to the plane of the LED. Similarly, the orthonormal vector, $o_r^i$, which is vertical to the plane of the i-th PD, represents the orientation of the i-th PD. Finally, the distance, $d_{i,j}$, between the i-th PD and the j-th LED can be computed as:

$$d_{i,j}=\|p_r^i-p_t^j\|_2 \quad (6)$$

In typical indoor LC scenarios, most of the optical signal energy is included in the LOS component. In more detail, the LOS component includes 95% of the energy collected by the PDs. Therefore, based on experimental measurements and academic research, the diffuse component, $h_{i,j}^{NLOS}(t)$, can be neglected. Thus, it is quite reasonable to assume that:

$$h_{i,j}^{LC}(t) \approx h_{i,j}^{LOS}. \quad (7)$$

Even though the optical bandwidth is large, LC communication is bandwidth limited due to the frequency selective nature of off-the-shelf LEDs. In more detail, an off-the-shelf LED behaves like a lowpass filter with a frequency response $H_{LED}(f)$. The specific form of the frequency response of an LED, $H_{LED}(f)$, depends on the specific type of LED (blue or white). Thus, it is expected to be given in the form of specifications from its manufacturer or obtained via experimental measurements. Note that $H_{LED}(f)$ does not depend on the specific positions of the deployed LEDs and PDs. Considering the approximation of the optical channel in (7) and the frequency response of the LED, $H_{LED}(f)$, the composite LC channel, which includes both the LED and the actual physical optical channel, is expressed (approximated) as:

$$H_{i,j}^{LC}(f) \approx h_{i,j}^{LOS} H_{LED}(f). \quad (8)$$

Note that, here, without loss of generality, it is indirectly assumed that all LEDs belong to the same family and have the same frequency response. If this is not the case, additional indices in (8) can be used for denoting the different frequency responses of each used family of LEDs.

Provided that the transmission rate is set properly for avoiding inter-symbol interference (ISI) or ISI can be neglected, the system equation of a single carrier MIMO LC system is expressed as:

$$y=rH_{LED}(f)H^{LC}x+w^{LC}. \quad (9)$$

In (9), the $N_r^{LC} \times 1$ received signal vector is expressed as y; the responsivity of the PD, in NW, is denoted by r; $H^{LC}$ is a $N_r^{LC} \times N_t^{LC}$ matrix which denotes the optical physical MIMO channel; the (i,j) element of $H^{LC}$, i=1, ..., $N_r^{CL}$, and, j=1, ..., $N_t^{CL}$, is given by (2); x is the $N_t^{CL} \times 1$ transmitted optical signal vector; the elements of x depend from the deployed MIMO transmission scheme and the used constellation for optically modulating binary data; finally, $w^{LC}$ is a $N_r^{LC} \times 1$ vector which represents the composite effect of ambient shot and thermal noise.

Due to the nature of the optical channel, the formation of orthogonal frequency division multiplexing (OFDM)-based communication is more challenging compared with radio frequency (RF) communication. In more detail, as mentioned before, the optical channel supports the transmission of real and non-negative signals. Therefore, the design of a multicarrier LC involves the treatment of the previous limitation. A technique for creating real signals from complex signals is the use of inverse fast Fourier transform (IFFT) combined with its Hermitian symmetry in the frequency domain. This technique creates real signals, which can be negative or positive, by sacrificing half of the available subcarriers. As the resulting signals are still negative or positive (bipolar), they can be represented/approximated in a positive form (unipolar). In literature, this has been achieved using different approaches. This resulted in a plethora of optical OFDM based modulation schemes (e.g., as described in a paper by Tsonev, Sinanovic and Haas, "Complete Modeling of Nonlinear Distortion in OFDM-Based Optical Wireless Communications", Journal of Lightwave Technology, vol 31, pp 3064-3076). One example is the DCO-OFDM which simply introduces a DC bias to resulting bipolar signals combined with clipping (for removing the large values). Despite the plethora of different OFDM based schemes, all schemes aim to create a number of orthogonal sub-carriers which form a flat transmit spectrum. Irrespective of the considered optical OFDM-based modulation scheme, the k-th sub-carrier is described mathematically as:

$$y_k = rH_{LED}(f_k)H^{LC}x_k + w_k, \quad (10)$$

$k=1 \ldots, N_c^{LC}$, after applying the IFFT and the appropriate representation processing. The last processing depends from the specific optical OFDM-based scheme. Here, $N_c^{LC}$ is the number of the created sub-carriers. Note that the previous equation holds as long as any form of linear and non-linear distortion, such as clipping for DC-OFDM, is ignored.

Cellular Deployment in LC Networks

Similar to RF communication, LC can be used in a cellular deployment where multiple access points (APs) are dedicated for providing wireless coverage in an indoor space. For example, multiple luminaries which act as LC APs can be placed properly in the ceiling of a room for the purposes of illumination and optical wireless communication. Here, it is assumed that the considered LC APs are interconnected using a backhaul connection, such as power-over-Ethernet. The main objective of cellular communication is to increase the number of served stations (STAs) by spatially separating the considered (indoor) space into multiple cells. Each cell is allocated a certain number of STAs which are served in a certain portion of the available optical spectrum. The spectrum allocation in each cell depends from the considered policy and frequency reuse factor. The value of the frequency reuse factor determines the level of interference observed by each cell. In the limit, the whole spectrum is used throughout the cellular network and the highest level of interference is observed. Furthermore, each STA is associated with a specific AP (cell) based on a certain objective function. For example, one method is to associate each STA to the AP which provides the highest value of signal-to-interference-plus-noise ratio (SINR). An alternative method is to associate each STA to the AP with closest spatial proximity. Note that in LC, due to the directional nature of the optical wireless channel, the formation of a LC cellular system is heavily influenced by the geometrical setup of the AP and the spatial positions and orientations of the STAs. This becomes clear by observing (2) and (8). Through (2) and (8), it can be seen that the parameters of the spatial setup of a transceiver along with its optical specifications determine the exact value of its optical channel and consequently its observed receive SINR.

Approximate Positioning in LC Cellular Networks

A major characteristic of LC is the very directional nature of its optical channel, especially under the use of lenses. In particular, this can be seen clearly from (2) and (8), where the optical wireless channel is approximated in a convenient form. In more detail, (2) and (8) show that the LC channel is determined by the geometric setup of the considered transceiver and the specifications of the deployed LEDs and PDs.

The achieved receive SINR of a LC transceiver, in the k-th subcarrier, is given as:

$$SINR_k = \frac{r^2 H_{LED}(f_k)^2 \|H^{LC}\|_F^2 P_k^2}{N_k + I_k}, \quad (11)$$

where, $P_k$ is the transmitted optical power in the k-th subcarrier; $N_k$ is the variance of the Gaussian and shoot noise in the k-th subcarrier; and $I_k$ is the interference power in the k-th subcarrier. Here, $\|\cdot\|_F$ is the Frobenius norm.

In the future cellular LC networks, it can be assumed that interference will be well controlled due to the careful deployment planning of the transmitting LED. Therefore, the effect of interference can be assumed either as negligible ($I_k \approx 0$) or the value of interference, $I_k$, can be accurately estimated or bounded for any given position in space. In particular, for each considered LC cell, the maximum level of interference, $I_{max}$, can be computed off-line for the coverage region of each cell. Thus, for each LC cell, the interference, $I_k$, in (11) can be treated as a deterministic quantity which is known. For this reason, the concurrent observation of (2)-(8), and (11) shows that the value of $SINR_k$ can be accurately estimated/bounded from (11) for each position in the three-dimensional space. Thus, if the cell association method used by a LC cellular network is based on the value of $SINR_k$ in (11), for one, a portion, or all the available subcarriers, the coverage area of each cell can be accurately defined and estimated. The direct result of this conclusion is that, when a LC receiver is associated with a certain cell, the network can accurately know the approximate position of this receiver. Obviously, this holds directly when the cell association is based on the spatial position of the LC receiver.

In general, it can be concluded that, due to the directional nature of the LC channel, the coverage space of an LC cell can be accurately estimated from the network. Thus, when a LC receiver is associated with a specific LC cell, its approximate position is directly known by the network.

Point-to-Point RF MIMO Beamforming

Assuming a multi-antenna transceiver in a RF OFDM-based communication system, the received signal for the k-th subcarrier is expressed as:

$$y_k^{RF} = W_k^H H_k^{RF} P_k x_k^{RF} + w_k^{RF}, \quad (12)$$

Here, $N_c^{RF}$ is the number of the total RF subcarriers. In (12), for the k-th subcarrier, $y_k$ represents the $N_r^{RF} \times 1$ received signal vector; $W_k$ represents the $N_r^{RF} \times s$ combiner, with s being the number of symbol streams transmitted from the transmitter to the receiver; $H_k^{RF}$ is the $N_r^{RF} \times N_t^{RF}$ wireless channel; $P_k$ denotes the $N_t^{RF} \times s$ beamformer in the transmitter; $x_k^{RF}$ stands for the $s \times 1$ information carrying vector; and $w_k^{RF} = w_k^H n_k$ is the $N_r^{RF} \times 1$ additive noise in the receiver. Here, $n_k$ is a $N_r^{RF} \times 1$ vector which represents the complex Gaussian noise. Also, $(\cdot)^H$ denotes the Hermitian matrix.

The RF multi-antenna transceiver is assumed to have a hybrid architecture. In particular, both analog and digital beamforming and receive combining matrices are used. In this case, the transmit beamforming matrix is expressed as:

$$P_k = BP_k^D, \quad (13)$$

where, B and $P_k^D$ are the $N_t^{RF} \times t$ analog beamformer (e.g., corresponding to a transmit beam) and the $t \times s$ digital precoder for the k-th subcarrier, respectively. Here, t is the number of RF chains in the transmitter. Similarly, the hybrid combiner $W_k$ is expressed as:

$$W_k = RW_k^D, \quad (14)$$

where, R is the $N_r^{RF} \times r$ analog combiner (e.g., corresponding to a receive beam) and $W_k^D$ is the $s \times r$ digital combiner for the k-th subcarrier. In the considered system, the number of the parallel symbol streams, s, transmitted from the transmitter to the receiver is given as, s=min(t,r). In (13) and (14), B and R are matrices that apply analog processing, i.e. phase processing, and are the same for all subcarriers. The previous analog processing may be implemented with RF phase shifters or delay elements which have finite states. In contrast, $P_k^D$ and $W_k^D$ are matrices which apply digital processing, that is both phase and amplitude processing. It is noted that different digital beamforming and combining matrices can be applied in different subcarriers.

In general, due to complexity constraints, it is expected that, $t \ll N_t^{RF}$, and, $r \ll N_r^{RF}$. This means that the number of antennas at the transmitter is significantly greater than the number of its RF chains. Similarly, the number of antennas at the receiver is significantly higher than the number of its RF chains. This is relevant as the RF chains are expensive and involve bulky circuits. Additionally, their technological improvement is considered slower compared to the rest of the circuitry of the transceiver. In the transmitter, each RF chain is supplied with a power amplifier (PA). It is understood that the PAs in the transmitter are responsible for a significant portion of the total power consumption. Thus, from the energy consumption point of view, there is an interest in reducing the number of deployed RF chains in the transmitter. Moreover, as shown below, the use of hybrid processing in the transceiver enables the fast design of the precoding and combing matrices, $P_k$ and $W_k$, respectively. This is particularly useful in massive MIMO application scenarios and in the mmWave bands where the values of $N_r^{RF}$ and $N_t^{RF}$ are expected to be large.

An efficient approach for designing the transmit precoder, $P_k$, and receive combiner, $W_k$, may be to split the design process in two phases. In the first phase, a codebook based approach is followed. Thus, the analog beamforming matrix B is selected from a set of possible beamforming matrices $\mathcal{B} = \{B_1, \ldots, B_{|\mathcal{B}|}\}$, while, the analog combining matrix R is selected from a set of possible combining matrices $\mathcal{R} = \{R_1, \ldots, R_{|\mathcal{R}|}\}$. In general, before the actual information transmission, the best pair of transmit and receive beams, denoted as $B_{opt}$ and $R_{opt}$, are selected from $\mathcal{B}$ and $\mathcal{R}$, respectively, via a training process. In particular, during this process, the transmitter and receiver try (e.g., sweep) all possible combinations of $B_i \in \mathcal{B}$, $i=1, \ldots, |\mathcal{B}|$, and $R_i \in \mathcal{B}$, $i=1, \ldots, |\mathcal{R}|$, in order to determine the best pair of transmit and receive beams $B_{opt}$ and $R_{opt}$. The selection of the best pair can be performed based on a certain selection metric. For example, $B_{opt}$ and $R_{opt}$ may correspond to the transmit and receive beams which result in the highest SINR. This process is called beam-sweeping. The process of beam-sweeping specifies $|\mathcal{B}| \|\mathcal{R}|$ time slots in order to try all possible combinations of beams and combiners from $\mathcal{B}$ and $\mathcal{R}$. In frequency division duplex (FDD)-based communication, beam-sweeping is repeated both in the UpLink (UL) and DownLink (DL). Whereas, in time division duplex (TDD)-based communication, the channel reciprocity can be exploited for executing beam-sweeping either in the DL or in the UL. It is noted that, in both cases, the process of beam-sweeping is concluded once the feedback is transmitted. In both cases, the sizes of $\mathcal{B}$ and $\mathcal{R}$, $|\mathcal{B}|$ and $|\mathcal{R}|$, respectively, determine the length of the training process. Larger values of $|\mathcal{B}|$ and $|\mathcal{R}|$ (more beams in $\mathcal{B}$ and $\mathcal{R}$) result in a longer beam-sweeping training process.

In the second phase, provided that the analog processing matrices B and R are available from the previous phase, the digital precoding matrices $P_k^D$ and the digital combining matrices $W_k^D$, with $k=1, \ldots, N_c^{RF}$, are designed based on the resulting virtual channel:

$$\overline{H}_k^{RF} = R^H H_k^{RF} B, \quad (15)$$

for any given method. Examples of such methods are the Zero Forcing (ZF) and Linear Minimum Mean Square Error (LMMSE) approach. Also, this can be done in a codebook or non-codebook based approach. It is noted that the size of $\overline{H}_k^{RF}$ in (15) is r×t which is usually significantly smaller than the size of $H_k^{RF}$ which is $N_r^{RF} \times N_t^{RF}$. This is due to the assumption that $t \ll N_t^{RF}$, and, $r \ll N_r^{RF}$. Therefore, the estimation of $\overline{H}_k^{RF}$ is simpler and faster than the estimation of $H_k^{RF}$. Furthermore, for a given design method, the computation of the digital processing matrices $P_k^D$ and $W_k^D$ is also simplified by considering $\overline{H}_k^{RF}$ instead of $H_k^{RF}$.

It is noted that in a real system implementation the sets $\mathcal{B}$ and $\mathcal{R}$ are finite. This is due to the fact that the deployed phase shifters or delay elements have finite states. The elements of $\mathcal{B}$ correspond to analog transmit beams of certain direction and shape. Similarly, the elements of $\mathcal{R}_{|\mathcal{R}|}$ represent combine/receive analog beams with a certain direction and shape. The shape of the transmit and receive beams in $\mathcal{B}$ and $\mathcal{R}$, respectively, depends on the geometry of the transmit and receive antenna panels. In general, an antenna panel accommodates multiple antenna elements placed in a certain one-, two-, or three-dimensional structure, where different groups of antenna elements may have different polarization. For example, recently, in the 3rd Generation Partnership Project (3GPP), two dimensional rectangular panels have been used with cross-polarized elements. Such an antenna deployment is capable of producing beams which can be focused in different directions in the three-dimensional space. This means that the produced beams have different orientations in the elevation and azimuth domain. In general, the beams in B become sharper and more directional as the number of transmit antennas, $N_t^{RF}$, is increased. Thus, as the number of transmit antennas is increased, the size of $\mathcal{B}$, $|\mathcal{B}|$, is also increased in order to cover a certain 3-dimension space. The same holds for the receive beams in $\mathcal{R}$. As the number of receive antennas is increased, the receive beams are becoming sharper and more directional. In addition, the number of available beams in $\mathcal{R}$, $|\mathcal{R}|$ is also increased. It is noted that such a deployment scenario is aligned with the needs of a communication system operating in the mmWave band where $N_r^{RF}$ and $N_r^{RF}$ need to be large.

It is noted that the system model of (12) is also able to represent: i) an analog transceiver, ii) a transceiver with an analog transmitter and a hybrid receiver, and iii) a transceiver with a hybrid transmitter and an analog receiver. This is performed by appropriately selecting the values of $N_t^{RF}$, $t$, $N_r^{RF}$, and $r$. Similarly, (12) represents a single stream transceiver when $s=1$, and a multi-stream transceiver when $s>1$. Therefore, even though the above description refers to a hybrid RF transceiver, its proposals and conclusions are directly applied to the previous three types of transceivers. Also, it is noted that (12) is able to describe both codebook and non-codebook based transmission and this depends on the approach used for selecting/designing $P_k$ in (13) and $W_k$ in (14).

Point-to-Point RF Digital MIMO Beamforming

In the scenario of pure digital beamforming and combining, the transmitter is supplied with $N_t^{RF}$ RF chains, while, the receiver is supplied with $N_r^{RF}$ RF chain. In this scenario and in order to be aligned with the previously described notation, it is assumed that, $t=N_t^{RF}$, $B=I_{N_t}$, $r=N_r^{RF}$, and, $R=I_{N_r}$. In this case, considering the previous assumptions (13) and (14), (12) is expressed as:

$$y_k^{RF}=(W_k^D)^H H_k^{RF} P_k^D x_k^{RF}+w_k^{RF}, \quad (16)$$

where, $W_k^D$ is a $N_r^{RF} \times s$ matrix, while, $P_k^D$ is a $N_t^{RF} \times s$ matrix. In a codebook based digital beamforming and combining system, the matrices $W_k^D$ and $P_k^D$ are selected from the set of possible beamforming matrices $\mathcal{P}=\{P_1, \ldots, P_{|\mathcal{P}|}\}$, and the set of possible combining matrices $\mathcal{W}=\{W_1, \ldots, W_{|\mathcal{W}|}\}$, respectively. The selection process of the optimal digital beamformer and combiner from $\mathcal{P}$ and $\mathcal{W}$, respectively, is the same as the selection process of the optimal analog beamforming and combining matrices described previously. In particular, the transceiver needs to sweep all possible combinations of digital beamforming matrices from $\mathcal{P}$ and the digital combining matrices from $\mathcal{W}$ in order to select the optimal pair. Therefore, the analysis presented above regarding the number of time slots specified for selecting the optimal pair of digital processing matrices and the way that this number is affected by the sizes of $\mathcal{P}$ and $\mathcal{W}$ is directly applicable to a codebook-based transceiver described by (16).

Alternatively, the matrices $W_k^D$ and $P_k^D$ in (16) can be designed based on a non-codebook approach. Usually this is performed based on the available channel knowledge. There may be designs where the matrices $W_k^D$ and $P_k^D$ are computed independently to each other or jointly in one of the communicating ends.

The invention claimed is:

1. A method performed by a node of a wireless communication network that includes a wireless device, a radio access network node and one or more wireless light communication (LC) network nodes, wherein at least one of the wireless device and the radio access network node comprises a plurality of antenna elements configurable to provide a transmit or receive radio beam for communication with the other of the wireless device and the radio access network node, wherein the method comprises:
obtaining an indication of one of the wireless LC network nodes with which the wireless device has established a wireless LC connection;
obtaining one or more first signal metrics for respective one or more first transmit or receive radio beams directed according to one of the following: towards a coverage area of the indicated wireless LC network node, or to receive transmissions from the coverage area of the indicated wireless LC network node; and
determining whether or not a particular one of the first transmit or receive radio beams corresponds to a line-of-sight (LoS) between the radio access network node and the wireless device, based on a comparison between the first signal metric for the particular first transmit or receive radio beam and a first threshold.

2. The method of claim 1, wherein the first threshold is based on an estimated distance between the wireless device and the radio access network node.

3. The method of claim 1, wherein:
the plurality of antenna elements are configurable to provide a plurality of pre-defined transmit or receive radio beams; and
the obtained one or more first signal metrics are for a subset of the plurality of pre-defined transmit or receive radio beams, the subset corresponding to one of the following:
transmit radio beams directed towards a coverage area of the indicated wireless LC network node, or
receive radio beams directed to receive transmissions from the coverage area of the indicated wireless LC network node.

4. The method of claim 3, wherein the plurality of pre-defined transmit or receive radio beams are associated with one or more of the following: a plurality of analog beamformers; a plurality of analog combiners; a digital codebook of beamformers; and a digital codebook of combiners.

5. The method of claim 1, further comprising obtaining one or more second signal metrics for respective one or more second transmit or receive radio beams not directed according to one of the following: towards the coverage area of the indicated wireless LC network node, or to receive transmissions from the coverage area of the indicated wireless LC network node.

6. The method of claim 5, further comprising determining whether or not RF communication is possible using the one or more second transmit or receive radio beams, based on comparing the obtained one or more second signal metrics to a second threshold.

7. The method of claim 5, wherein obtaining the one or more second signal metrics is responsive to a determination that no LoS exists between the radio access network node and the wireless device.

8. The method of claim 1, wherein obtaining the indication of the wireless LC network node comprises one of the following:
receiving, from the wireless device, a message comprising the indication of the wireless LC network node; or
receiving, from the wireless LC network node, a message comprising an indication of an identity of the wireless device.

9. The method of claim 1, wherein each of the first signal metrics comprises one or more of the following: received signal strength, received signal power, received signal quality, signal-to-noise ratio, and signal-to-noise-and-interference ratio.

10. The method of claim 1, further comprising utilizing a LoS transmit or receive radio beam to perform time-of-flight measurements between the wireless device and the radio access network node.

11. The method of claim 1, wherein the method is performed by one of the following: the wireless device; the radio access network node; and a communication network node.

12. A non-transitory machine-readable medium storing instructions executable by processing circuitry of a node of a wireless communication network that includes a wireless device, a radio access network node and one or more wireless light communication (LC) network nodes, wherein at least one of the wireless device and the radio access network node comprises a plurality of antenna elements configurable to provide a transmit or receive radio beam for communication with the other of the wireless device and the radio access network node, wherein execution of the instructions by the processing circuitry causes the node to:
obtain an indication of one of the wireless LC network nodes with which the wireless device has established a wireless LC connection;

obtain one or more first signal metrics for respective one or more first transmit or receive radio beams directed according to one of the following: towards a coverage area of the indicated wireless LC network node, or to receive transmissions from the coverage area of the indicated wireless LC network node; and determine whether or not a particular one of the first transmit or receive radio beams corresponds to a line-of-sight (LoS) between the radio access network node and the wireless device, based on a comparison between the first signal metric for the particular first transmit or receive radio beam and a first threshold.

13. A node of a wireless communication network that includes a wireless device, a radio access network node and one or more wireless light communication (LC) network nodes, wherein at least one of the wireless device and the radio access network node comprises a plurality of antenna elements configurable to provide a transmit or receive radio beam for communication with the other of the wireless device and the radio access network node, wherein the node comprises:

processing circuitry; and a non-transitory machine-readable medium storing executable instructions that, when executed by the processing circuitry, cause the node to:

obtain an indication of one of the wireless LC network nodes with which the wireless device has established a wireless LC connection;

obtain one or more first signal metrics for respective one or more first transmit or receive radio beams directed according to one of the following: towards a coverage area of the indicated wireless LC network node, or to receive transmissions from the coverage area of the indicated wireless LC network node; and determine whether or not a particular one of the first transmit or receive radio beams corresponds to a line-of-sight (LoS) between the radio access network node and the wireless device, based on a comparison between the first signal metric for the particular first transmit or receive radio beam and a first threshold.

14. The node of claim 13, wherein the first threshold is based on an estimated distance between the wireless device and the radio access network node.

15. The node of claim 13, wherein:

the plurality of antenna elements are configurable to provide a plurality of pre-defined transmit or receive radio beams; and the obtained one or more first signal metrics are for a subset of the plurality of pre-defined transmit or receive radio beams, the subset corresponding to one of the following:

transmit radio beams directed towards a coverage area of the indicated wireless LC network node; or receive radio beams directed to receive transmissions from the coverage area of the indicated wireless LC network node.

16. The node of claim 15, wherein the plurality of pre-defined transmit or receive radio beams are associated with one or more of the following: a plurality of analog beamformers; a plurality of analog combiners; a digital codebook of beamformers; and a digital codebook of combiners.

17. The node of claim 13, wherein execution of the instructions further causes the node to obtain one or more second signal metrics for respective one or more second transmit or receive radio beams not directed according to one of the following: towards the coverage area of the indicated wireless LC network node, or to receive transmissions from the coverage area of the indicated wireless LC network node.

18. The node of claim 17, wherein execution of the instructions further causes the node to determine whether or not RF communication is possible using the one or more second transmit or receive radio beams, based on comparing the obtained one or more second signal metrics to a second threshold.

19. The node of claim 17, wherein execution of the instructions causes the node to obtain the one or more second signal metrics responsive to a determination that no LoS exists between the radio access network node and the wireless device.

20. The node of claim 13, wherein execution of the instructions causes the node to obtain the indication of a wireless LC network node based on one of the following:

receiving, from the wireless device, a message comprising the indication of the wireless LC network node; or receiving, from the wireless LC network node, a message comprising an indication of an identity of the wireless device.

21. The node of claim 13, wherein each of the first signal metrics comprises one or more of the following: received signal strength, received signal power, received signal quality, signal-to-noise ratio, and signal-to-noise-and-interference ratio.

22. The node of claim 13, wherein execution of the instructions further causes the node to utilize a LoS transmit or receive radio beam to perform time-of-flight measurements between the wireless device and the radio access network node.

23. The node of claim 13, wherein the node is one of the following: the wireless device; the radio access network node; and a communication network node.

* * * * *

UNITED STATES PATENT AND TRADEMARK OFFICE
CERTIFICATE OF CORRECTION

PATENT NO. : 11,929,780 B2
APPLICATION NO. : 17/619776
DATED : March 12, 2024
INVENTOR(S) : Stavridis et al.

Page 1 of 1

It is certified that error appears in the above-identified patent and that said Letters Patent is hereby corrected as shown below:

In the Specification

In Column 4, Line 19, delete "(N R)." and insert -- (NR). --, therefor.

In Column 13, Line 3, delete "$\mathcal{R}_{NLoS}$" and insert -- $\mathcal{R}_{NLoS}$. --, therefor.

In Column 16, Line 64, delete "$N_r$," and insert -- $N_r$ --, therefor.

In Column 17, Line 53, delete " $\psi_{i,j} = \arccos\left(\frac{\text{dot}(o_t^j, p_r^i - p_t^j)}{d_{i,j}}\right)$ " and insert -- $\psi_{i,j} = \arccos\left(\frac{\text{dot}(\mathbf{o}_r^i, \mathbf{p}_t^j - \mathbf{p}_r^i)}{\mathrm{d}_{i,j}}\right).$ --, therefor.

In Column 18, Line 38, delete "NW," and insert -- A/W, --, therefor.

In Column 18, Line 45, delete "$N_r{}^{LC}$ X l" and insert -- $N_r{}^{LC}$ X1 --, therefor.

In Column 21, Line 39, delete "$\mathcal{R} = \{R_1 \ldots, \mathbf{R}_{|\mathcal{R}|}\}$." and insert -- $\mathcal{R} = \{\mathbf{R}_1, \ldots, \mathbf{R}_{|\mathcal{R}|}\}$. --, therefor.

In Column 22, Line 22, delete "$\mathbf{R}_{|\mathcal{R}|}$" and insert -- R --, therefor.

In Column 22, Line 46, delete "$\mathcal{R}, |\mathcal{R}|$" and insert -- $\mathcal{R}, |\mathcal{R}|$, --, therefor.

Signed and Sealed this
Twenty-fifth Day of February, 2025

Coke Morgan Stewart
*Acting Director of the United States Patent and Trademark Office*